June 3, 1969  J. S. McCARTNEY  3,447,857
METHOD OF SELECTIVE STRESSING AND BIREFRINGENT ARTICLE
Filed Aug. 19, 1965
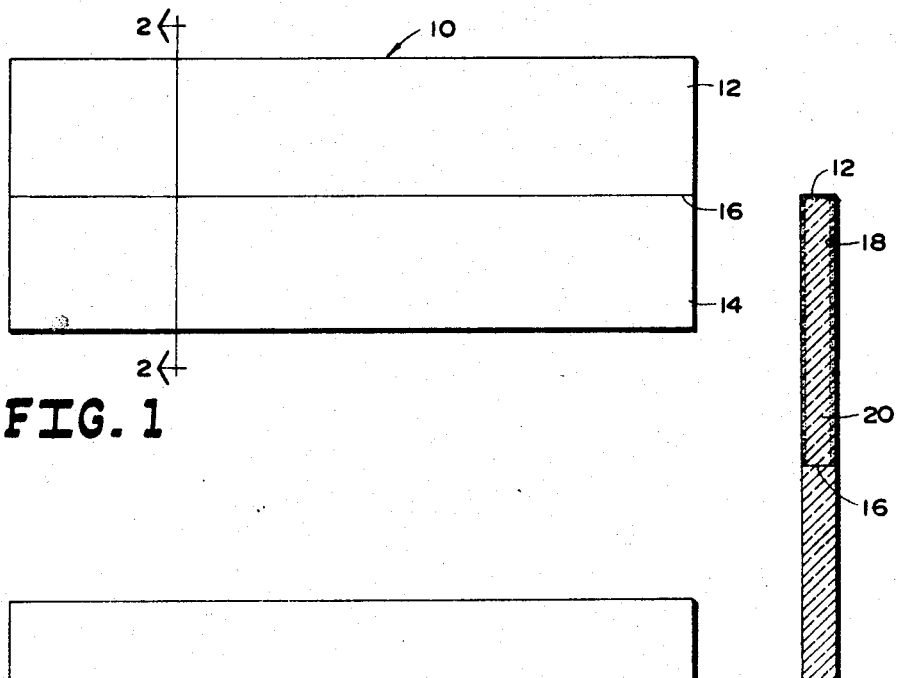
FIG. 1
FIG. 2
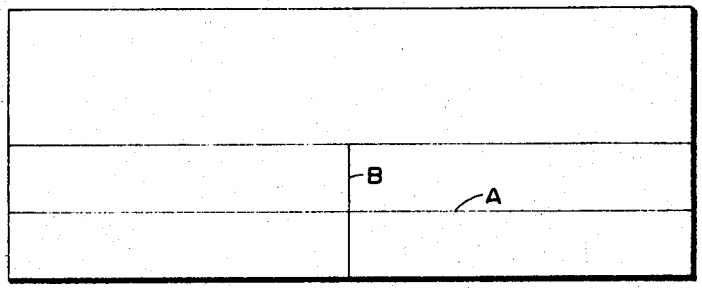
FIG. 3
INVENTOR.
John S. McCartney
BY Milton Peterson
ATTORNEY

United States Patent Office 3,447,857
Patented June 3, 1969

3,447,857
METHOD OF SELECTIVE STRESSING AND BIREFRINGENT ARTICLE
John S. McCartney, Corning, N.Y., assignor to Corning Glass Works, Corning, N.Y., a corporation of New York
Filed Aug. 19, 1965, Ser. No. 481,034
Int. Cl. G02f 1/24
U.S. Cl. 350—157    4 Claims

ABSTRACT OF THE DISCLOSURE

The present invention relates to a glass article having a varying birefrigence, and to a method of producing such article by imparting compressive stress within a selected portion of a surface zone on the article. It is particularly concerned with such a glass article having a major plane and two major axes which are generally perpendicular to one another, the article being adapted to transmit light perpendicular to the major plane and, with respect to such transmitted light, exhibiting a birefrigence pattern such that the birefringence is substantially uniform along one axis and varying along the other.

---

Birefringence, or double refraction as it is sometimes termed, is a well known phenomenon in stressed transparent glass and plastic materials and in certain transparent crystalline materials, e.g. calcite crystals. The uniformity of birefringence of retardation in the natural crystal materials had led to their use in the form of prisms or wedges to provide gradient birefringence elements such as the well known compensators used in conjunction with polariscopes. Other applications are currently developing in the new optical art of light amplification for articles exhibiting such varying birefringence.

While the natural crystalline materials have performed quite satisfactorily in the past, the difficulty and cost of obtaining such materials in a sufficiently uniform state has limtied their use to relatively small articles. Furthermore, the limited source of supply of suitable materials creates an uncertainty with respect to the future. It becomes desirable therefore to produce an article of corresponding characteristics from a material or type of material which is not subject to such handicaps. It is a primary purpose of the present invention then to provide a glass article which meets these and other qualifications.

The production of compressive stresses within a surface zone on a glass article, with counterbalancing tensile stresses concentrated in a central or core portion of the article, forms the basis of a widely employed technique of glass strengthening. The compressively stressed surface zone is produced by such diverse means as thermal tempering, physical and/or chemical alternation of the glass, or formation of a new surface layer of glass or glasslike material. However, the overall uniform surface treatment normally employed in strengthening a glass article does not provide birefringent characteristics that are effective for present purposes.

It has also been found that a gradient type of treatment does not provide a satisfactory form of varying birefringence pattern. Thus, dipping a glass sheet into an ion exchange bath and slowly withdrawing the sheet at a constant rate to produce a varying degree of intensity of compressive stress along the sheet is not effective. It is then a further purpose to provide a method of utilizing induced stresses in a glass article to produce a glass article having a varying birefringence pattern along a major axis.

I have found that such a desired birefringence pattern can be achieved by selectively stressing one portion of an article so that the surface zone of this portion is compressively stressed to the exclusion of that in an adjacent portion or, alternatively, to a greater degree. This creates a line of stress discontinuity between the two portions of the article and causes a mechanical interaticon in the nature of a bending moment to be impressed between them. This then creates a secondary stress condition in the article that is effective to provide the desired birefringence when light is suitably transmitted through the article.

The article of my invention then is a birefringence element comprising a body of glass having a major plane and two major axes that are generally perpendicular to each other, the body having a first selected portion with a system of compressive stresses developed in the surface zone thereof and a counter-balancing system of tensile stresses within the body, and a second selected portion contiguous to the first which is free from these stress systems, or wherein they exist to a lesser degree, whereby a line of stress discontinuity exists between such portions of the glass body and the first portion of the glass body creates a bending moment with respect to the second portion, the body thereby having a gradient distribution of secondary stresses induced by such bending moment and a pattern of stress-induced birefringence that varies along one major axis and is essentially uniform along at least a portion of the other major axis. The invention further resides in a method of introducing stresses into a glass article to obtain such distribution of stresses and consequent variable birfringence, preferably an ion exchange method.

The glass body will be in the shape of a simple rectangular flat plate or sheet for most purposes. However, for special applications, it may take other forms such as a disc or a shallow curved or sagged plate. In general then, the body may be considered as having one major plane and two major axes of symmetry, the latter being generally perpendicular to each other.

The invention is further described with reference to the accompanying drawings wherein, FIGURES 1 and 2 are, respectively, a plan view, and a section view along line 2—2, of a typical birefringence element in accordance with the invention, and FIGURE 3 is a view corresponding to FIGURE 1 showing schematically the birefringence pattern of the element of that figure.

The birefringence element shown in FIGURE 1 consists of a thin glass plate generally designated by the numeral 10 and having a uniform thickness that is preferably not over about ⅛ of an inch. Glass plate 10 is composed of two sections 12 and 14 which are separated by a line of stress discontinuity 16.

As illustratively shown in FIGURE 2, section 12 of element 10 has a surface zone 18 in which a substantial degree of compressive stress is developed, usually to a uniform degree throughout the zone. It further includes an inner zone 20 in which tensile stresses are concentrated in such amount as to counter-balance the compressive stresses in surface zone 18. By analogy, the stress distribution illustratively shown in section 12 corresponds to that customarily existing in a glass article strengthened by such means as chemical strengthening or thermal tempering.

In FIGURE 2, section 14 is shown as being completely free of any compressively stressed surface zone or layer, thereby producing a line 16 of stress discontinuity between the sections. It will be appreciated that, which this absence of stress is a convenient situation for purposes of description and illustration, it is by no means essential to the purposes of the invention. In fact, to obtain the greater range of polarized light retardation normally desired, it becomes necessary to mildly strengthen section 14 in order to minimize a tendency to breakage since the secondary stresses developed therein are in part of a tensile nature. This generally requires imparting some degree of compressive stress in its surface. However this degree must be substantially less than that of section 12.

The essential condition, for present purposes, is a substantial difference in the degree of stress imparted in the surface zone of two different sections of a glass article such as element 10, whereby a line of stress discontinuity between the two sections exists. With reference to FIGURE 1 then, area 14 is here referred to as an area of lower stress to generically include a situation of relatively mild stress as well as one in which there is no stress imparted at all in the surface zone of the section. As indicated, the invention is conveniently described in terms of the latter situation wherein section 14 has no stress imparted.

In understanding the present invention, it is necessary to distinguish between stresses introduced by treating a portion of the surface zone of a glass article to impart compressive stress in the surface zone and balancing tension in an interior, e.g. zones 18 and 20 in FIGURE 2, and stresses indirectly created by the interaction between such stressed portion of the article and a contiguous lesser stressed portion of the article, e.g. sections 12 and 14 in FIGURE 1. The first type of stress condition is referred to, for purposes of differentiation, as primary stress. The existence of such a stressed condition in but one portion of glass element 10 creates the latter type of stress which is here referred to as a secondary stress because of its derivative nature. These secondary stresses develop as a result of the forces exerted by the stressed section 12 on the lesser or unstressed section 14 of the article.

The nature and magnitude of these secondary stresses can be indicated by an analysis similar to that developed by S. Timoshenko for bimetallic elements subject to a temperature change, Journal of the Optical Society of America, vol. 11, (1925), page 233. The general treatment is found in standard texts on Strength of Materials where the nature or pattern of stress distribution produced is indicated. The introduction of surface compression and balancing central tensile stress requires a transverse dilation of the article. This extension is directly related to the degree of central tension. Sections 12 and 14 of element 10 in FIGURE 1 would thus have differing degrees of strain. If one assumes equal areas for section 12 and section 14, identical effective elastic constants and a central tensile stress for section 12 of 6400 p.s.i. which is appropriate for an ion exchange treatment providing a relatively low gradient of birefringence, calculation shows approximately 130 millimicrons change in retardation per inch along the vertical axis of symmetry in section 14. A plate approximating these conditions was found to possess a gradient of 170 millimicrons change in retardation per inch in the central portion of section 14. The use of unequal areas for sections 14 and 12 is desirable for many applications but calculation requires the introduction of additional forces of unknown distribution across the ends of boundary line 16. It was also found that masking procedures to permit this boundary to be curved improved the uniformity of birefringence gradient along the horizontal axis of symmetry. Other forms of geometric shaping of section 12 and section 14 may also aid in producing linearity of the gradient over a larger portion of section 14.

Element 10 is adapted to be mounted or held along its edges inasmuch as birefringent characteristics near the edges tend to be too variable for practical use. It is necessarily employed in a system or apparatus which transmits light through the glass along lines generally normal to the major surface as seen in FIGURE 1.

With respect to birefringence effects, the primary stresses developed in zones 18 and 20 tend to cancel out and have no effect on the transmitted light. However, with respect to such transmitted light, the secondary stresses, set up by the bending moment created between the two sections of the article, do impart a definite birefringence distribution.

This may be illustratively indicated with reference to FIGURE 3 wherein the drawing is a schematic view representing element 10. Horizontal line A and vertical line B schematically indicate the axes of symmetry within section 14.

When element 10 is mounted and used in the indicated manner, there will be a constant or uniform condition of birefringence or retardation along at least a central portion of horizontal line A. Conversely, there will be a constantly changing or gradient condition of birefringence or retardation along line B. This condition will be of a generally linear nature in at least the central portion of section 14 although there will be a sharp discontinuity or displacement at line 16. It will be apparent that the birefringence or retardation pattern created, particularly when of a linear gradient nature, is adapted to compensator applications.

It will be understood that the primary stress condition existing in section 12 of element 10 may be imparted by any of the well known methods of introducing compressive stress. However, it has been found particularly convenient to employ an ion exchange technique wherein a glass article is partially immersed in a molten salt bath which provides an exchange ion. The invention is further described with respect to a specific example thereof employing this particular means of stress production.

A 2½" x 5" rectangular section was cut from a 0.100" thick ribbon of a silicate glass having the following approximate composition by weight: 62.0 $SiO_2$, 24.2 $Al_2O_3$, 7.2 $Na_2O$, 0.1 $K_2O$, 3.6 $Li_2O$, 1.9 MgO and 1.0 $Sb_2O_3$. The glass was inserted to its midpoint (to a depth of about 1¼") in a sodium salt bath (85% $NaNO_3$—15% $Na_2SO_4$) for four hours with the bath at a temperature of 450° C. to develop compressive stresses in a surface layer on the treated half. When retardation was measured in a central portion of the glass, over a 1.0" vertical portion of the untreated half of the glass, the retardation value changed by 170 millimicrons.

Further experiments showed that the useful area, i.e. the area having a linear gradient, could be broadened by treating the ends of the plate to a greater depth. This was accomplished by masking a portion of the plate and then immersing the entire plate in the bath. Thus a parabolic shaped masking pattern was imposed to provide greater edge treatment. This had the further advantage of providing a sharp, controlled line of discontinuity. An iridized metal oxide film such as tin oxide provides a convenient mask.

It will be appreciated that numerous variations in materials and/or practice will become readily apparent and hence are contemplated as within the scope of the appended claims.

I claim:

1. A method of producing a birefringence element having a pattern of stress induced birefringence of varying distribution which comprises providing a plate-like body of glass having a major plane and two major axes and selectively creating within a surface layer on a portion of the glass body a system of compressive stresses substantially greater than that existing in the corresponding surface layer of the contiguous portion of the article.

2. A method in accordance with claim 1 wherein the glass article is formed from a lithium silicate glass and the surface layer is compressively stressed by exchanging an ion of relatively larger ionic diameter for a portion of the lithium ions.

3. A method in accordance with claim 2 wherein the ion exchange is effected in both portions of the glass article, but to a substantially greater extent in the section having a greater surface compressive stress.

4. A birefringence element consisting of a plate-like body of glass having a major plane and two major axes that are generally perpendicular to each other, the body having a first selected portion with a system of compressive stresses developed in a surface zone thereof and a counter-balancing system of tensile stresses within the body and a second selected portion contiguous to the first, the first portion having a system of compressive stresses substantially greater than that existing in the surface layer of the second portion, so that a line of stress discontinuity exists between the first and second portions of the glass body and the first portion of the glass body creates a bending moment with respect to the second portion, the body thereby having a varying distribution of secondary stresses induced by such bending moment and a pattern of stress induced bifringence, with respect to light transmitted normal to the major plane of the glass article, such that the birefringence varies along one major axis and is essentially uniform along at least a portion of the other major axis of the body, and wherein the glass is a silicate glass containing lithium ions and the compressive stresses in the surface zone of the glass are developed by ions of relatively larger ionic diameter occupying a portion of the lithium ion sites in the glass.

References Cited
UNITED STATES PATENTS 3,287,200  11/1966  Hess et al. _____ 65—30 XR DONALL H. SYLVESTER, *Primary Examiner.*

J. H. HARMAN, *Assistant Examiner.*

U.S. Cl. X.R.

65—30, 114, 115; 350—320